(12) United States Patent  (10) Patent No.: US 8,132,451 B2
Law et al.  (45) Date of Patent: Mar. 13, 2012

(54) CHARACTERIZATION TOOLS FOR TONER ADHESION AND ADHESION DISTRIBUTION

(75) Inventors: Kock-Yee Law, Penfield, NY (US); Grazyna E. Kmiecik-Lawrynowicz, Fairport, NY (US); Weiqiang Ding, Potsdam, NY (US); Cetin Cetinkaya, Potsdam, NY (US)

(73) Assignee: Xerox Corporation, Norwalk, CT (US)

( * ) Notice: Subject to any disclaimer, the term of this patent is extended or adjusted under 35 U.S.C. 154(b) by 408 days.

(21) Appl. No.: 12/482,154

(22) Filed: Jun. 10, 2009

(65) Prior Publication Data

US 2010/0313644 A1 Dec. 16, 2010

(51) Int. Cl.
*G01B 21/08* (2006.01)
*G01N 17/00* (2006.01)
*G01N 3/56* (2006.01)
*G01N 19/02* (2006.01)
*G03G 15/08* (2006.01)
*G03G 9/00* (2006.01)

(52) U.S. Cl. ........... 73/150 R; 73/9; 399/253; 430/111.4

(58) Field of Classification Search .................... 850/35; 356/502, 486; 73/150 R
See application file for complete search history.

(56) References Cited

U.S. PATENT DOCUMENTS

2003/0020500 A1* 1/2003 Altmann et al. ............. 324/750
2008/0090259 A1* 4/2008 Toone et al. ................. 435/7.25

FOREIGN PATENT DOCUMENTS

JP 2002-311003 10/2002

OTHER PUBLICATIONS

Wieqiang Ding. "Micro/Nano-particle Manipulation and Adhesion Studies." Journal of Adhesion Science and Technology. Nov. 9, 2007. pp. 457-480.
Ding W. et al. "Rolling resistance moment of microspheres on surfaces: contact measurements." Philosophical Magazine, vol. 87, Nos. 34-36, Dec. 2007. pp. 5685-5696.
Manabu Takeuchi. "Adhesion forces of charged particles." Chemical Engineering Science. Jun. 21, 2005. pp. 2279-2289.
Hild S. et al. "Adhesion of Silica Particles and Silylated Silicon Tips on Model Toner Surfaces—A SFM Study." IS&T's NIP19:2003 International Conference on Digital Printing Technologies. pp. 155-160.
Law K-Y et al. "Adhesion and Adhesion Distribution in a Model Toner System."NIP25 and Digital Fabrication 2009. Technical Program and Proceedings. pp. 7-10.

(Continued)

*Primary Examiner* — Lisa Caputo
*Assistant Examiner* — Roger Hernandez-Prewitt
(74) *Attorney, Agent, or Firm* — Oliff & Berridge, PLC

(57) ABSTRACT

A system, method and device for measuring toner performance by randomly applying a toner sample having toner particles to a substrate, and positioning the substrate such that a force may be applied to individual particles of the measuring toner. A rolling resistance or rotation of the individual particles of the measuring toner is measured. The measurements may be analyzed to determine adhesion and distribution properties of individual toner particles of the measuring toner sample.

17 Claims, 4 Drawing Sheets

OTHER PUBLICATIONS

European Search Report issued in EP Application No. 10164542.2 on Oct. 15, 2010.

"Letter to the Editor Comments on 'Adhesion of Silica-Coated Toner Particles to Bisphenol-A Polycarbonate Films',".

Mizes et al., "Small particle adhesion: measurement and control," Colloids and Surfaces A: Physiochemical and Engineering Aspects, 2000, vol. 165, pp. 11-23.

Hays et al., "Electrostatic adhesion of ion and triboelectric-charged particles," Journal of Electrostatics, 2005, vol. 63, pp. 687-692.

Rimai et al., Toner Adhesion: Effects of Electrostatic and van der Waals Interactions, Journal of Imaging Science and Technology, vol. 46, No. 3, 2002, pp. 200-207.

"Photographic Science and Engineering," Official Publication of the Society of Photographic Scientists and Engineers, 1982, vol. 26; No. 4, pp. 193-197.

Donald et al., "The Influence of Electric Fields on Particle Adhesion in Xerographic Developer Mixtures," Photographic Science and Engineering, 1970, vol. 14., No. 1, pp. 36-41.

* cited by examiner

CHARACTERIZATION TOOLS FOR TONER ADHESION AND ADHESION DISTRIBUTION

BACKGROUND

The exemplary embodiments are directed to a system, method and device for measuring toner adhesion and adhesion distribution among particles of a toner sample.

The xerographic process relies on the transfer of charged toner particles from one surface to another by way of an applied electric field. A base (toner) particle is a composite material generally made by melt-mixing a polymer resin with an appropriate pigment, along with optional charge control agent, gel additive and other processing aids, followed by extrusion, pulverization and classification to produce the base toner particle of a certain size. Toner is then made by blending the base particles with surface additives such as silica particles and titania particles to control the flow and charge of the final toner. Sometimes optionally zinc stearate, PTFE particles, CeO particles or blade lubricant additive $U_{add}$ can be used to aid the performance of the final toner in a given printing system. The toner particles may be irregular or substantially spherical in shape depending on the manufacturing process.

More recently, chemical processes, such as suspension polymerization and emulsion aggregation (EA) processes, are used to manufacture the base (toner) particles. These base toner particles are substantially more spherical. Surface additives may then be blended onto the surface of the base toner particles as described above. The theoretical amount of surface area that is covered by the surface additives can be calculated based on the size of the base toner particles and the size of the additive particles. The term 100% SAC (surface area coverage) denotes the state where the entire surface of the toner particle is covered with additive, theoretically.

Generally, the performance of the toner, e.g., flow, improves as the amount of additive increases or as SAC increases. In the other words, there is a minimum amount of surface area coverage for optimal performance. In toner manufacturing, the SAC is usually set above the minimum value to ensure high toner performance latitude in the machine and robust manufacturing. Even with this precaution, due to human error, raw material sourcing problems, or blending machine issue, additives sometimes may not be blended as well as needed for the process designed. In such a case, even though the SAC is above the minimal value, the additive is not distributed uniformly as designed and this results in toner particles with inferior performance or off the performance specification.

Today, this performance shortfall can only be revealed by system test in machine. At the time of the machine test, large quantities of toner have already been made. This off-spec batch of toner will have to be discarded or recycled, thus wasting time and money. A simpler method for detecting this kind of shortfall prior to the machine test is needed. The essence of the xerographic process lies in the manipulation of toner particles through the print engine, from the development subsystem to the photoreceptor to paper and then fusing. Toner adhesion plays a critical role in this toner marking process. The ability of knowing the adhesion of the toner in terms of the actual value and its distribution would be crucial in predicting its performance in machine.

A number of toner adhesion measurement techniques, such as electric field detachment ("e-field detachment"), ultra-centrifugation, and atomic force microscopy ("AFM") have been reported. E-field detachment emulates development at a mag brush and electrostatic transfer at the transfer nip. B-field detachment only measures electrostatic adhesion force and the measurement only determines the average adhesion of many toner particles, not the distribution of adhesion within the toner sample. The technique is similar to xerography.

The centrifugal detachment technique measures detachment of toner particles by centrifugal force. This technique aids in determining the average adhesion of many toner particles, but not distribution thereof. The centrifugal detachment technique measures electrostatic as well as Van der Waals forces for a batch of toner particles. The measurement provides an average adhesion for a toner sample, but not the distribution of adhesion. Specifically, there are many toner particles within a toner sample. The centrifugal detachment technique determines the average adhesion even though the actual adhesion of each toner particle is different; and there exists a distribution of adhesion among the many toner particles.

Atomic force microscopy is used to determine adhesion force by measuring the Van der Waals forces of a single toner particle. However, the technique is limited in that only a single particle is measured, one area at a time, and thus statistical data is difficult to obtain. Atomic force microscopy directly measures the adhesion force between a toner particle and a substrate.

The above-discussed techniques measure adhesion, but not distribution of adhesion in a given sample of toner particles. For every toner sample, there may be thousands of toner particles. While distributions of toner size, shape and charge are known, very little is known about the distribution of adhesion within a toner sample. There is also very little information about the uniformity of adhesion within a toner particle.

The above-discussed techniques yield data in the form of a percent of toner detached during e-field detachment; a percent of toner removed during centrifugal detachment; or adhesion force in the case of atomic force microscopy, but only for a single toner particle, one contact area in each measurement.

SUMMARY

It would be advantageous to provide a system and method for a measurement of toner particles for a toner sample. A system, method and device is disclosed for determining the unique characteristics of individual toner particles to better understand toner adhesion and distribution of adhesion across a toner sample, and for measuring uniformity of adhesion for a given particle.

To address or accomplish these advantages, advantages described below, and/or other advantages, a rolling resistance measurement system, method, and device is disclosed. Exemplary embodiments may include at least a step of randomly applying a measuring toner sample to a surface (a sample may consist of many toner particles), bringing the surface having the measuring toner deposited thereon within a reachable distance from the urging members, urging the toner using the urging members, and measuring the resistance of the toner. The measuring toner may be randomly applied. More specifically, the system and method includes applying a measuring toner including a plurality of toner particles to a substrate, the substrate being attached to a nanomanipulator, and bringing the substrate to a position reachable from an urging member such as a micro-cantilever. Exemplary embodiments of the system and method further include urging one of the plurality of toner particles, and measuring the rolling resistance of the one of the plurality of toner particles. The toner particles may be urged by physically pushing the particle with the micro-cantilever or other urgeable member. Alternatively, the urgeable member may be configured to apply acoustic force to the particle to be urged.

To obtain a statistical distribution of adhesion for the given toner sample, after one rolling resistance measurement, the micro-cantilever will move to measure the rolling resistance of another toner particle, through movement of the nanomanipulator. This process is repeated many times such as 20 to 50 times, so that the distribution of adhesion within the toner sample becomes statistically meaningful.

Exemplary embodiments are described herein. However, it is envisioned that any arrangement of measuring devices that may incorporate the features of the system and method for toner particle adhesion and distribution measurement described herein are encompassed by the scope and spirit of the exemplary embodiments.

EMBODIMENTS

Figure 1A:
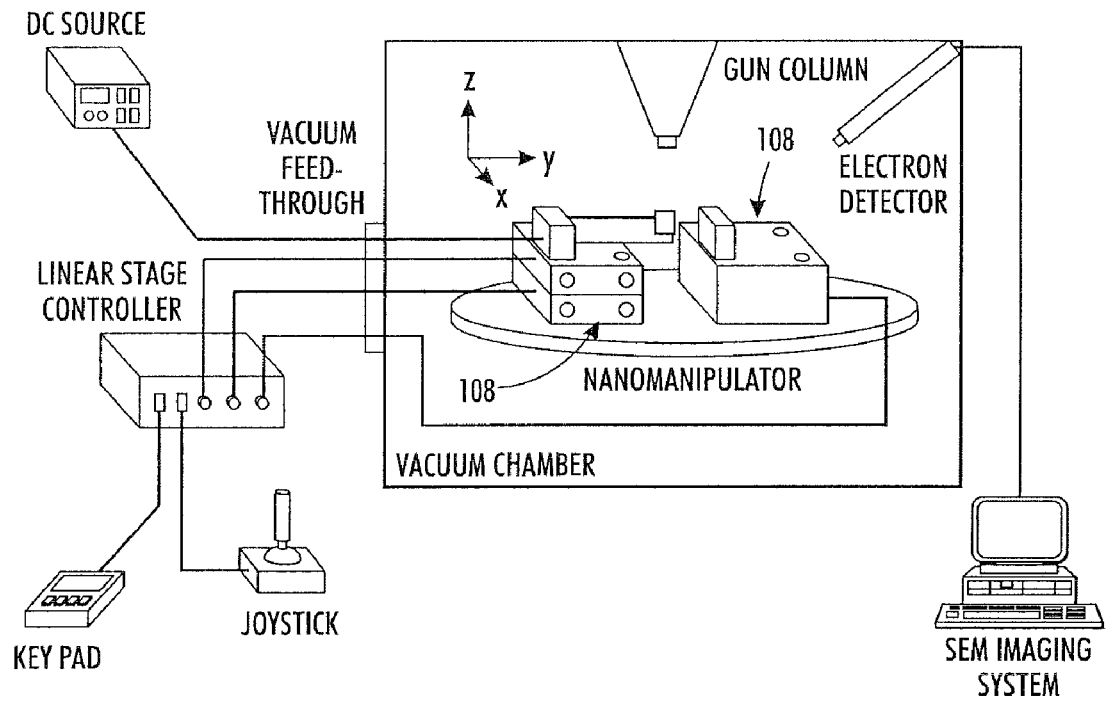
FIG. 1a shows a system for measuring toner adhesion and adhesion distribution in accordance with one embodiment.

The exemplary embodiments are intended to cover all alternatives, modifications and equivalents as may be included within the spirit and scope of the systems and methods as defined herein.

For an understanding of the system, method and device for measuring toner adhesion and distribution of adhesion within a toner sample, reference is made to the drawings. In the drawings, like reference numerals have been used throughout to designate similar or identical elements. The drawings depict various embodiments and data of embodiments of illustrative adhesion and distribution measurement systems and methods incorporating the features of the exemplary embodiments therein.

Figure 1B:
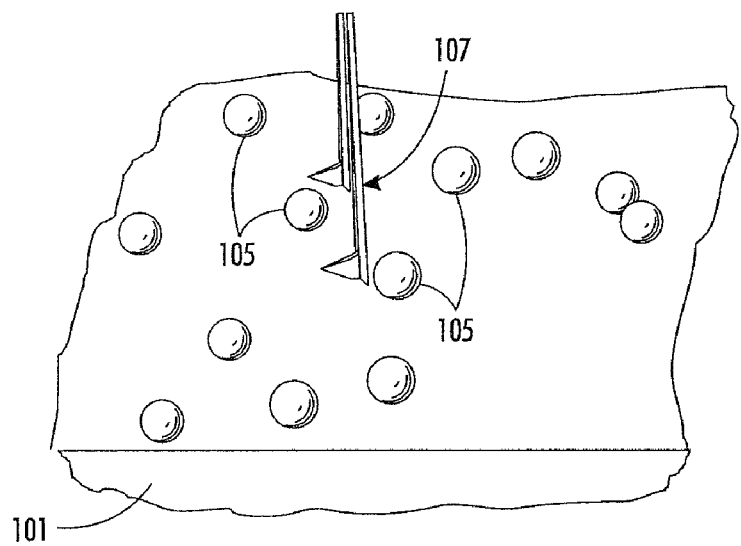
FIG. 1b shows toner particles of a measuring toner on a substrate positioned within reachable distance from an exemplary urging member.

Referring now to FIGS. 1a and 1b, an embodiment of a system, method and device for toner adhesion and distribution measurement may include a substrate 101 and urging members 107. The substrate may be composed of for example, a silicon wafer surface. Toner particles 105 of a measuring toner may be placed, e.g. sprayed or dusted, onto the surface of the substrate 101. The measuring toner may represent a randomly chosen sample of toner. The urging members 107 positioned near the substrate 101 may include, for example, a micro-cantilever or other suitable arrangement for urging toner base particles that may range in diameter from 3 µm to 10 µm or above.

In an exemplary embodiment, the substrate 101 may be mounted on a nanomanipulator 108, which may bring the toner particles 105 to a position within a reachable distance from urging member 107. The use of a nanomanipulator may further accommodate very precisely controlled fine movement in the x-y-z directions. In alternative embodiments, the substrate may be a photoreceptor surface, an intermediate transfer belt, or media such as paper.

As shown in FIG. 1b, in an exemplary embodiment, as the surface of the substrate 101 is traveling from left to right, urging members 107 are used to urge individual toner particles 105. A rolling resistance of the particles 105 may be measured. The individual toner particles 105 may include a base polymer, which may be substantially spherical in shape. Additive, for example silica particles, may be distributed about the surface of the spherical polymer toner particle by dry blending. As such, the urging members 107, which may include a micro-cantilever, should be of a size sufficient to accommodate urging of the polymer toner particles. In an alternative embodiment, the urging members 107 may be caused to produce an acoustic force for urging the toner particles 105. The particles 105 may be observed using, for example, an optical microscope imaging system or other suitable observation and/or measuring device or system.

Figure 2:
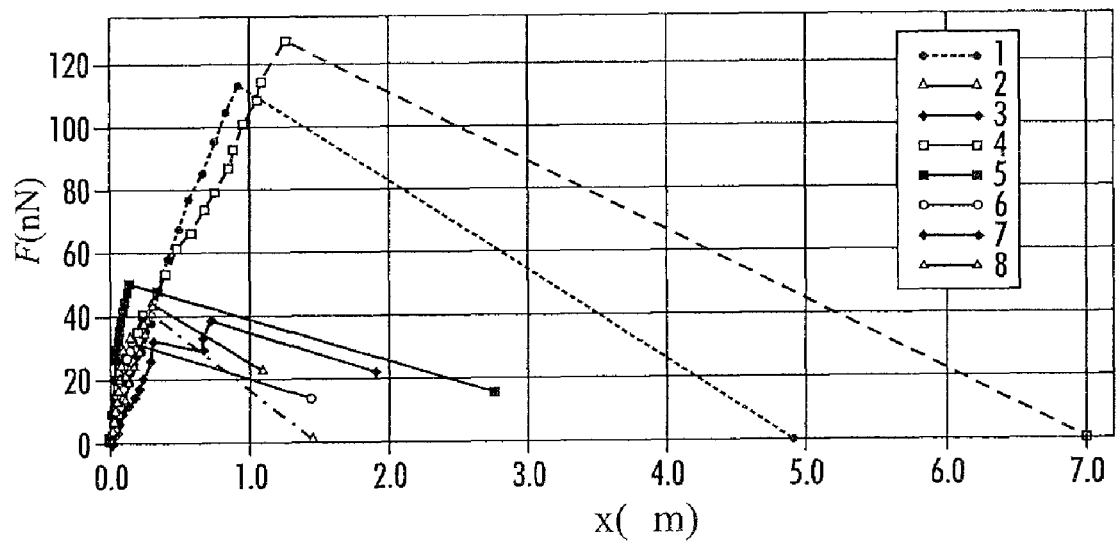
FIG. 2 shows a displacement curve of rolling resistance measurements taken in accordance with an exemplary embodiment.

As shown in FIG. 2, a force displacement curve may be produced based on the rolling resistance measurements taken from a measuring toner particle 105. A slope may be determined from the forced displacement curve, and from the slope, the work of adhesion may be determined. The work of adhesion for a series of spherical toner particles with varying SAC may range from 0% to 100%.

Figure 3:
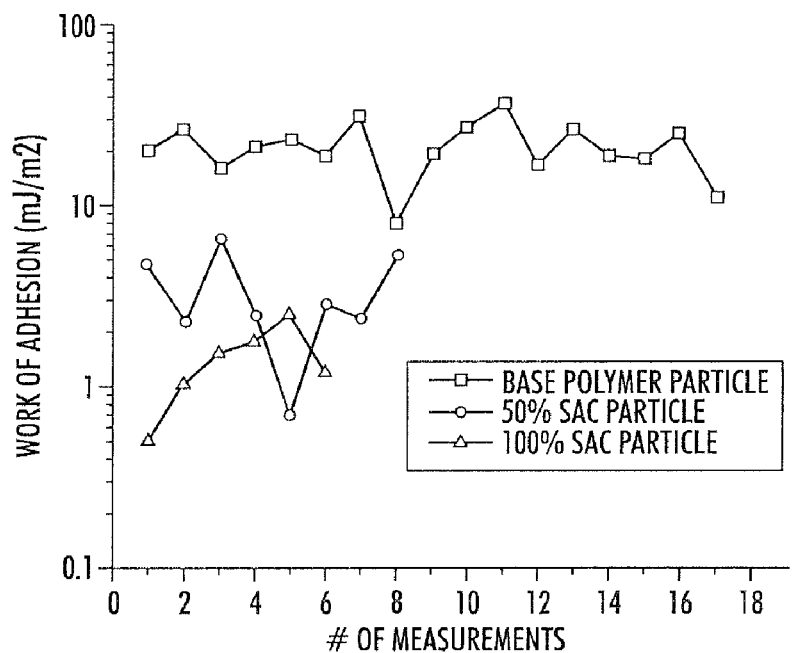
FIG. 3 shows work of adhesion data taken in accordance with an exemplary embodiment.
Figure 4:
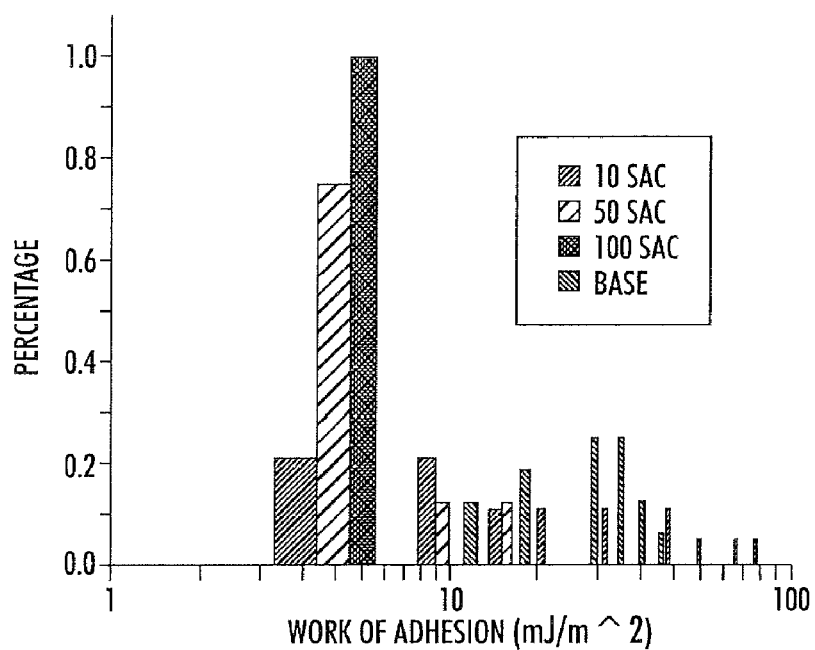
FIG. 4 shows distribution of work of adhesion for data taken in accordance with an exemplary embodiment.

As shown in FIG. 3, raw data indicates that particles with full additive coverage exhibit a lower work of adhesion compared with base particles having no additive. For example, FIG. 3 shows that base particles having 100% SAC exhibit a mean work of adhesion that is lower than the mean work of adhesion for base toner particles having 50% SAC and 0% SAC. Because each rolling resistance only measures the adhesion of the toner particle that is urged, the measurement can be repeated with different particles in the same toner sample many times to acquire the statistic distribution of adhesion for a given toner sample. For example, FIG. 4 shows the histogram of work of adhesion for particles with varying SAC. The results show that the base particles have a high work of adhesion with a broad distribution. When the surface is fully covered with additive, i.e., 100% SAC, adhesion is low and the statistical distribution or work of adhesion may be narrow.

Figure 5:
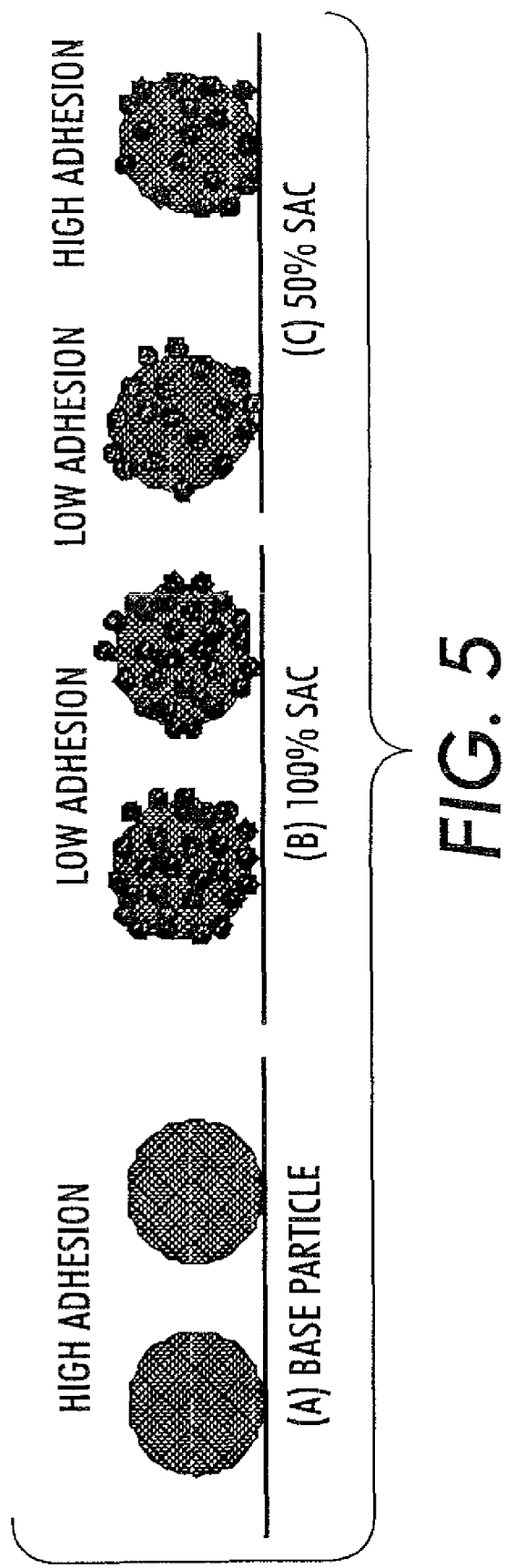
FIG. 5a is a diagrammatical view of toner base particles without additive.
FIG. 5b shows base toner particles having additive.
FIG. 5c shows toner base particles having additive.

FIG. 5a shows toner base particles having 0% SAC. These particles exhibit high adhesion. FIG. 5b shows toner base particles having 100% SAC. These toner particles may exhibit low adhesion. FIG. 5c shows two toner base particles having 50% SAC, but differing properties of adhesion. In this case, particles may exhibit low adhesion when the landing surface, i.e., the surface in contact with the substrate at any given time, is fully covered with additive, and higher adhesion when the landing surface has a varying degree of surface coverage with additive. The system and methods of the exemplary embodiments enable distinguishing characterization of the distribution of adhesion within a given toner sample, an ability not provided by the prior art.

The embodiments may therefore account for variations in surface chemistry of base toner particles, and extent and localization of additive coverage of particular toner particles, and when executed randomly. The data shown in FIGS. 4 and 5a-c reveals that the rolling resistance measurement technique disclosed herein accommodates measuring the work of adhesion of a toner sample, and can also shed light on the uniformity of adhesion or the additive distribution about a given toner sample.

While measurement of adhesion and distribution properties of toner sample (particles) has been described in conjunction with specific embodiments thereof it is evident that many alternatives, modifications, and variations will be apparent to those skilled in the art. Accordingly, embodiments of the system. Method, and device as set forth herein are intended to be illustrative, not limiting. There are changes that may be made without departing from the spirit and scope of the exemplary embodiments.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method of measuring toner adhesion and distribution of adhesion, the method comprising:
   randomly applying measuring toner to a surface;
   applying a force to the measuring toner using a plurality of urging members; and
   measuring a rolling resistance of the measuring toner.

2. The method of claim 1, further comprising:
   positioning the surface within a reachable distance from the urging members.

3. The method of claim 1, further comprising:
   positioning the surface by moving the surface in the x-y-z directions.

4. The method of claim 1, wherein the measuring toner includes a plurality of toner particles, the method further comprising applying the force to at least one of the plurality of toner particles using one of the plurality of urging members.

5. The method of claim 1, wherein the rolling resistance of the measuring toner is repeatedly measured so as to accommodate measuring a statistical distribution of adhesion for the randomly applied measuring toner.

6. A method for predicting toner performance using the method of claim 1.

7. A system for measuring toner performance, the system comprising:
   means for applying and supporting a measuring toner;
   means for applying a force to the measuring toner; and
   means for measuring a rolling resistance of the measuring toner, wherein the means for measuring generates an acoustic force that is applied to at least one of a plurality of toner particles of the measuring toner such that a motion of the at least one of the plurality of particles may be observed.

8. The system of claim 7, wherein the means for supporting includes a silicon wafer substrate.

9. The system of claim 8, wherein the silicon wafer substrate is attached to a nanomanipulator that is moveable in the x-y-z directions.

10. The system of claim 7, wherein the means for measuring includes a plurality of micro-cantilevers, and wherein the micro-cantilevers apply a force to at least one of a plurality of toner particles of the measuring toner.

11. The system of claim 7, wherein the acoustic force is an air-coupled acoustic excitation.

12. A device for measuring toner performance, the device comprising:
   a substrate that supports measuring toner;
   urging members for applying a force to the measuring toner; and
   a sensor for measuring a change in the measuring toner, wherein the change in the measuring toner is determined by measuring a rolling resistance of the measuring toner or measuring rotation in the measuring toner.

13. The device of claim 12, wherein the sensor is an acoustic sensor.

14. The device of claim 12, wherein the substrate is a photoreceptor.

15. The device of claim 12, wherein the substrate is an intermediate transfer belt.

16. The device of claim 12, wherein the substrate is a paper.

17. A method of quality controlling toner using the device of claim 12.

* * * * *